United States Patent
Hoegerl

(10) Patent No.: US 7,481,542 B2
(45) Date of Patent: Jan. 27, 2009

(54) REARVIEW MIRROR SYSTEM—ESPECIALLY FOR A MOTOR VEHICLE

(75) Inventor: Klaus Hoegerl, Furth im Wald (DE)

(73) Assignee: Flabeg GmbH & Co. KG, Fuerth (DE)

( * ) Notice: Subject to any disclaimer, the term of this patent is extended or adjusted under 35 U.S.C. 154(b) by 0 days.

(21) Appl. No.: 11/562,599

(22) Filed: Nov. 22, 2006

(65) Prior Publication Data

US 2007/0127128 A1 Jun. 7, 2007

(30) Foreign Application Priority Data

Nov. 23, 2005 (DE) .................. 10 2005 056 168

(51) Int. Cl.
- *G02B 5/08* (2006.01)
- *G02B 27/00* (2006.01)
- *G01J 1/44* (2006.01)

(52) U.S. Cl. .................... 359/604; 250/214 R; 359/601

(58) Field of Classification Search ............. 250/214 R, 250/214 AL, 214.1, 205, 226; 359/601–604
See application file for complete search history.

(56) References Cited

U.S. PATENT DOCUMENTS

| | | |
|---|---|---|
| 4,799,768 A | 1/1989 | Gahan |
| 4,917,477 A | 4/1990 | Bechtel et al. |
| 5,659,423 A * | 8/1997 | Schierbeek et al. ......... 359/604 |
| 6,379,013 B1 * | 4/2002 | Bechtel et al. .............. 359/604 |
| 6,396,040 B1 * | 5/2002 | Hill ............................ 250/205 |

FOREIGN PATENT DOCUMENTS

| | | |
|---|---|---|
| DE | 3722348 | 10/1988 |
| DE | 19622002 | 12/1997 |

* cited by examiner

*Primary Examiner*—Kimberly D. Nguyen
*Assistant Examiner*—Jennifer Bennett
(74) *Attorney, Agent, or Firm*—Darby & Darby

(57) ABSTRACT

A rearview mirror system), in particular for a motor vehicle, including a rearview mirror provided with a reflection part with variable reflectance and a control system associated with the reflection part and including a number of illuminance sensors, configured for a particularly reliable determination of a nominal value for the reflectance which is adapted to the situation and to the requirements. The spectral response of an illuminance sensor provided as a glaring-illuminance sensor is configured to provide a response characteristic shifted towards shorter wavelengths as compared to a scotopic eye response characteristic. Advantageously, the spectral response of a further illuminance sensor provided as a glaring-illuminance sensor, in the manner of a double sensor design, may be configured to provide a response characteristic shifted towards longer wavelengths as compared to the scotopic eye response characteristic.

10 Claims, 4 Drawing Sheets

US 7,481,542 B2

REARVIEW MIRROR SYSTEM—ESPECIALLY FOR A MOTOR VEHICLE

Priority is claimed to German Patent Application No. DE 10 2005 056 168.3, filed Nov. 23, 2005, the entire disclosure of which is incorporated by reference herein.

The present invention relates to a rearview mirror system, in particular for a motor vehicle, comprising a rearview mirror provided with a reflection part with variable reflectance, and a control system associated with the reflection part and comprising a number of illuminance sensors.

BACKGROUND

Typical known coatings for automobile mirrors usually consist of relatively highly reflecting metals, such as, for example, silver or aluminum. The reflection values achievable with them for automobile mirrors amount to more than 85% in the visible light spectrum. Although, however, relatively high reflection values are desirable in the daylight, they might glare the driver at night through the headlights of the following vehicles. Therefore, mirror coatings were developed which are destined to reduce the glaring effect when driving at night. For this purpose, one can use, on the one hand, mirror systems which have a relatively low glaring effect at night, due to suitably designed reflecting elements, using in particular spectrally selective reflection coatings. On the other hand, one can also use rearview mirrors in which the risk of glaring through the headlights of the following vehicles is reduced by the fact that the mirror structure contains parts of variable transmission, switched, for example, electrically.

In rearview mirrors designed in such a way, a reflection part with variable reflectance is used, using, for example, electrochromic elements or LCD elements. These can be integrated in the layer structure of the mirror system, for example in the manner of an intermediate layer, it being possible to vary the transmission of the respective optically active layer by supplying it with a suitably chosen control signal and to modify in this way the reflectance of the reflection part of the rearview mirror.

In such systems, usually a plurality of design targets have to be taken into account. On the one hand, it is desirable to keep the glaring of the driver through the headlights of the following vehicles as low as possible. For this purpose, the rearview mirror should be switched to relatively dark, i.e. to a relatively low reflectance, when driving at night. On the other hand, however, also and especially at night, it should be guaranteed that the environment, i.e., for example, the surroundings of the vehicle, is perceived as reliably as possible, for which purpose a relatively high reflectance of the mirror is required. In order to provide the optimum compromise between these design targets, control or check units can be used in rearview mirror systems with a rearview mirror provided with a reflection part with variable reflectance, which supply the reflection part with a control value suitably chosen under certain conditions.

In order to suitably take into account the ambient light and glaring conditions, such rearview mirrors are usually provided with at least two light sensors, the first one measuring the illuminance impinging on the rearview mirror from the forward direction, which is representative for the background or ambient light, and the second one measuring the illuminance impinging from the backward direction, which is characteristic of the glaring through the following vehicles. The measured values supplied by these sensors can be used for specifying a suitable nominal value for the reflectance of the rearview mirror, the effects of usually quickly changing lighting conditions on the one hand and the inertia of the human eye due to physiological reasons on the other hand being taken into account or compensated through suitable averaging of the obtained measured values and in particular through suitably chosen low pass circuits and the like.

In such a rearview mirror system, as known, for example, from U.S. Pat. No. 4,917,477, it is generally tried to evaluate the ambient light and glaring illuminance in a way particularly close to reality, in particular in order to be able to provide in a particularly reliable way a nominal value for the reflectance of the rearview mirror which is particularly well adapted to the current glaring situation. Usually, these rearview mirror systems are based on the assumption that the glaring light should ideally be evaluated in accordance with the so-called eye response characteristic. On the one hand, a glaring of the driver shall be effectively avoided through timely and sufficient dimming of the rearview mirror, but, on the other hand, an excessive dimming of the rearview mirror should also be avoided in view of the perception of the environment.

SUMMARY OF THE INVENTION

It is an object of the present invention to provide a rearview mirror system of the above-mentioned type, with which these general design targets can be achieved in a particularly simple and reliable way.

The present invention provides a rearview mirror system, in particular for a motor vehicle, comprising a rearview mirror provided with a reflection part with variable reflectance and a control system associated with the reflection part and comprising a number of illuminance sensors, in which the spectral response of an illuminance sensor provided as a glaring-illuminance sensor is designed in such a way that its response characteristic is shifted towards shorter wavelengths in comparison with the scotopic eye response characteristic Therefore, the illuminance sensor provided as a glaring-illuminance sensor has according to its design a spectral response characteristic with a distribution which is shifted towards shorter wavelengths in comparison with the scotopic eye response characteristic in such a way that the average, the maximum or the median lies on a smaller wavelength value than the corresponding value of the scotopic eye response characteristic. The spectral response characteristic of the glaring-illuminance sensor is, therefore, designed in such a way that the evaluation of the illuminances and thus the generation of the nominal value will take into account the glaring illuminances with shorter wavelengths, i.e. in particular in the blue range, to a greater extent than the evaluation according to the scotopic eye response characteristic would do. The glaring-illuminance sensor, designed in this way with the emphasis on the blue range, can be executed as a sensor in the proper sense. Alternatively, however, a system consisting of sensor elements with individually different response characteristics can also be provided. These sensor elements are functionally linked with each other in a suitable manner, for example through difference forming, for generating an "effective" response characteristic shifted towards the blue range.

For an activation of the rearview mirror in a way particularly well adapted to the requirements and to the situation, the physiology of the eye should be taken into account to a particularly high degree when dimming the mirror. It should be taken into account in particular that the human eye does not perceive light spectra, concerning the brightness perceived, uniformly, but weights them according to the so-called eye response characteristic, which in the daylight or in bright ambient light conditions shows the photopic form and at night or in dark ambient conditions, the scotopic form. When driving a car, however, it is not quite dark due to the car's own lighting, so that in this case, a mean or mesopic response characteristic of the eye should be taken as a basis. Surprisingly, it turned out that exactly when evaluating the glaring light as correctly as possible from the point of view of the physiology of the eye, it has to be assumed that a glaring which is felt to be particularly troublesome is caused in particular by the blue contribution of the glaring light and above all by the contribution which stimulates the retinal cones which are sensitive to blue. The highest response of the retinal cones sensitive to blue is found for a wavelength of approx. 445 nm.

In addition, it should be taken into account that mirror systems with variable reflectance may have spectra properties which change as a function of the adjusted reflectance. For example, such mirror systems may, during dimming from a reflectance of about 70% to a reflectance of about 10%, change their color from neutral in the direction of blue, so that the blue contributions of the glaring light reflected in the mirror and perceived by the driver are selectively intensified as regards their relative contributions in the spectrum. Furthermore, modern headlight systems, whose emitted light is responsible for the glaring caused by the rearview mirror, have relatively high blue contributions in their spectrum, which is true in particular of the increasingly used xenon headlights (HID) or also of headlight in LED technology. To appropriately take into account these aspects in view of a nominal value generation particularly well adapted to the situation in question, the spectral response of the illuminance sensor provided for the evaluation of the glaring illuminance should be suited for a higher emphasis of wavelengths in the blue range.

In order to be able to take into account to a particularly large extent varying ambient light conditions and, therefore, also the changing spectral response of the eye, the illuminance sensor provided as a glaring-illuminance sensor is advantageously completed by another illuminance sensor provided as a glaring-illuminance sensor. The latter has a spectral response characteristic which is different from that of the first glaring-illuminance sensor. The further illuminance sensor provided as a glaring-illuminance sensor can expediently be designed in such a way that its response characteristic corresponds approximately to the scotopic eye response characteristic, or in such a way that its response characteristic is shifted towards shorter wavelengths in comparison with the scotopic eye response characteristic. Particularly advantageously, however, the spectral response of the further illuminance sensor provided as a glaring-illuminance sensor is designed in such a way that its response characteristic is shifted towards longer wavelengths in comparison with the scotopic eye response characteristic. Thus, in a rearview mirror system designed in such a way in the manner of a double sensor design, the glaring illuminance is acquired by two illuminance sensors with different spectral responses, so that through varying weighting of the measured values supplied by these two sensors, a nominal value for the reflectance can be generated, taking into account the glaring illuminance, which is particularly well adapted to the situation and to the requirements. Even in changing light conditions, the illuminance can thus be acquired, through an appropriately modified weighting of the two sensor contributions, in a way which is particularly close to the actual physiology of the eye. The overall characteristic of the sensors can be adapted in a particularly variable way to a possibly fluctuating response characteristic of the eye.

Advantageously, the illuminance sensors are connected to a check unit determining a nominal value for the reflectance by means of the sensor signals. The check unit preferably takes into account the sensor signals of the illuminance sensors provided as glaring-illuminance sensors in relation to each other, weighted as a function of the glaring illuminance and/or the ambient light illuminance. In particular, within the framework of signal processing, the blue contribution can be taken into account to a larger extent or can be evaluated with higher weighting, if a relatively strong glare was detected.

Furthermore, it is possible, in an alternative or additional advantageous design, to effect by the evaluation an adaptation to individual findings or marginal conditions regarding the current driving situation, the environment or even the driver himself, through a suitable weighting, varying as a function of the situation, of the measured values acquired by the two glaring-illuminance sensors having different spectral responses. Preferably making use of relations firmly specified and/or stored in a characteristic diagram and/or specified by a user, concerning the weighting of the two sensors, individual properties of the driver can be acquired and can also be taken into account. When utilizing characteristic diagrams, in particular the set nominal values for the reflectance can be used as input quantities. Alternative or additionally, dynamic characteristic diagrams can be used which take into account, for example, the history of the lighting conditions.

In a method for operating this rearview mirror system, the nominal value for the reflectance of the reflection part is advantageously determined taking into account the measured values of the illuminance sensors provided as glaring-illuminance sensors, suitably weighted in relation to each other with a view to the before mentioned criteria.

The advantages achieved with the invention include, in particular, that through the higher weighting of the blue contribution in the glaring illuminance, the higher risk of glaring caused by the blue contribution is appropriately taken into account when activating the rearview mirror. The design of the rearview mirror system with at least two glaring-illuminance sensors with different spectral responses enables, furthermore, to a particularly favorable extent, an adaptation of the evaluation of the glaring illuminance to varying parameters depending on the environment, to the total illuminance given, or to individual properties of the driver, which can be effected in a particularly simple way in particular through a suitable weighting of the respective acquired illuminances in relation to each other.

BRIEF DESCRIPTION OF THE DRAWINGS

An exemplary embodiment of the invention is explained in more detail with reference to the drawings, in which.

DETAILED DESCRIPTION

Figure 1:
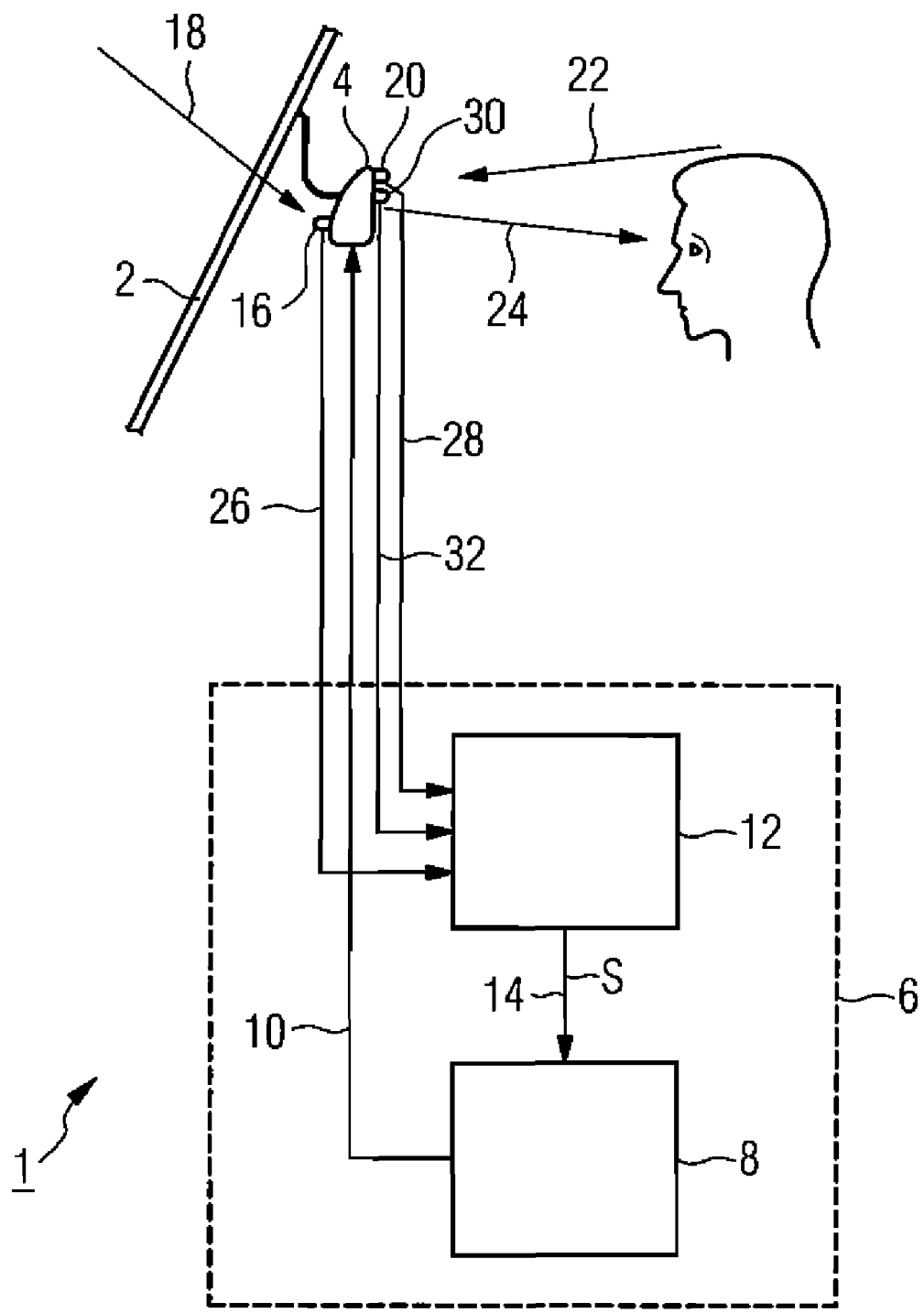
FIG. 1 shows a schematic view of a rearview mirror system for a motor vehicle.

The rearview mirror system 1 according to FIG. 1 is provided for use in a motor vehicle, of which FIG. 1 only shows the windshield 2. On the windshield 2, a rearview mirror 4 is fixed in the traditional way as an interior mirror, the rearview mirror being designed in a way not shown in detail as a rearview mirror with variably reflectance. For this purpose, the rearview mirror 4 is designed in the exemplary embodiment as an electrochromic mirror, another suitable embodiment, for example as an LCD mirror, being, however, also imaginable. The rearview mirror 4 comprises in a way not shown in detail a reflection part with variable reflectance.

For adjusting a desired reflectance, the rearview mirror system 1 comprises in a control system 6 a control unit 8 associated with the reflection part, emitting, as shown by the arrow 10, an activation signal, for example a control voltage, to the rearview mirror 4. As a function of this control signal, the reflection part of the rearview mirror 4 will change its reflectance in the usual way.

The control unit 8 specifies the control signal as a function of a plurality of imaginable parameters. In particular, a nominal value S provided by an associated check unit 12 will be taken into account, as indicated by the arrow 14. The control unit 8 is designed for emitting, based on the transmitted nominal value S, a suitable control signal, in particular a suitable activation voltage, to the rearview mirror 4 in such a way that the latter's reflectance is optimally approximated to the nominal value S. Measured actual values and other fed parameters can also be taken into account, whereby an automatic control can be arranged downstream, in particular taking into account the nominal value S.

To adjust on the rearview mirror 4 a reflectance optimally adapted to the situation and to the requirements, the rearview mirror system 1 comprises in addition a first illuminance sensor 16 arranged on the rearview mirror 4, facing in forward direction. The illuminance sensor 16 determines a measured value $a_l$ for the ambient light illuminance or background illuminance, as indicated by the arrow 18. Furthermore, a second illuminance sensor 20 is provided, which is facing in backward direction of the motor vehicle and determines a measured value $b_l$ for the glaring illuminance due to the light emitted by the headlights of the following vehicles and other light sources from behind. This is indicated by the arrow 22. Thus, through the glare of the following vehicles, the glare illuminance $b_l$ R reaches the driver's eye, after reflection on the rearview mirror 4, R being the reflectance of the rearview mirror 4. This is indicated by the arrow 24. The measured values $a_l$, $b_l$ determined by the illuminance sensors 16, 20 are transmitted, as indicated by the arrows 26, 28, to the check unit 12 and used there for determining the nominal value S for the reflectance of the rearview mirror 4. The determination of the nominal value S is effected cyclically with a cycle time ÿt of for example, 0.2 s.

The rearview minor system 1 is designed for a determination of the nominal value S in a manner particularly well adapted to the requirements, taking into account specifically and to a large extent the particularities of the physiology of the eye, focusing in particular on the conception that in view of the physiology of the eye, especially the blue contribution of the glaring light should be taken into account to a higher degree when considering the glaring illuminance. To enable this, the spectral response of the illuminance sensor 20 provided as a glaring-illuminance sensor is designed in such a way that its response characteristic is shifted towards shorter wavelengths in comparison with the scotopic eye response characteristic. In the response characteristic of the illuminance sensor 20 provided as a glaring-illuminance sensor, the emphasis, the average value and/or the maximum lie, therefore, on smaller wavelength values than the corresponding values of the scotopic eye response characteristic. Therefore, when determining the nominal value S, glaring illuminances with shorter wavelengths, i.e. in the blue range, will be taken into account to a relatively larger extent, making use of the measured value $b_l$ for the glaring illuminance.

In order to be able, in addition, to adapt, in the manner of a particularly variable and adaptable characteristic, the process of the nominal value generation to varying external conditions or also in an individualized way to the driver, a further illuminance sensor 30 designed as a glaring-illuminance sensor is additionally provided, which also determines a measured value $b_l'$ for the glaring illuminance. The measured value $b_l'$ determined by the illuminance sensor 30 is transmitted, as indicated by the arrow 32, to the check unit 12 and can there also be used for determining the nominal value S for the reflectance of the rearview mirror 4. In order to be able to suitably take into account the effects of different ambient conditions or individual properties on the spectral response of the eye, the illuminance sensor 30 is designed for a spectral response characteristic which is different from that of the illuminance sensor 20. The illuminance sensor 30 could be adapted, in the manner of known illuminance sensors, for example to the spectral response characteristic of the eye in scotopic vision; in the exemplary embodiment, however, the spectral response of the illuminance sensor 30 is designed in such a way that its response characteristic is shifted towards longer wavelengths in comparison with the scotopic eye response characteristic.

Therefore, the illuminance sensors 20, 30 determine two measured values $b_l$, $b_l'$ for the glaring illuminance and transmit them to the check unit 12, different spectral contributions in the glaring illuminance being differently taken into account in the two measured values $b_l$, $b_l'$. While in the measured value $b_l$, the blue contribution of the glaring illuminance is taken into account to a relatively large extent, this blue contribution is rather underrepresented or taken into account to a low degree in the measured value $b_l'$. In the check unit 12, the measured values $b_l$, $b_l'$ are evaluated in a weighted manner for determining the nominal value S in such a way that depending on the situation and the environment, different relative weightings of the two measured values $b_l$, $b_l'$ are taken into account.

Such a situation dependent weighting of the measured values $b_l$, $b_l'$ can in particular take into account the fact that in the state of glare, the human eye reacts relatively more sensitively to the blue contribution of the spectrum. Therefore, if in connection with the determination of the nominal value in the check unit 12, the state of glare of the eye is recognized, the evaluation of the glaring illuminance will take into account the blue contribution in the glaring-light spectrum to a higher degree, through a correspondingly higher weighting of the measured value $b_l$ as compared with the measured value $b_l'$.

Furthermore, the weighting of the measured values $b_l$, $b_l'$ taken into account can also be effected as a function of a multitude of further parameters, with corresponding weighting factors being suitably stored, for example in the manner of characteristic diagrams, in the check unit 12 or in a storing unit associated to them. Alternatively or additionally, it can also be provided, if necessary, to manually influence or adjust the weighting factors, for example in order to take into account individual properties of the driver. As a result, the equipment of the rearview mirror system 1 with at least two illuminance sensors 20, 30 designed as glaring-illuminance sensors, having different spectral response characteristics, creates an additional degree of freedom for the evaluation of the determined glaring illuminances, allowing to take into account a multitude of parameters when calculating the nominal value S for the reflectance R of the rearview mirror 4 and a particularly far reaching implementation of eye-physiological findings.

In the exemplary embodiment, two separate illuminance sensors 20, 30 designed as glaring-illuminance sensors are provided. Of course, they can be integrated in one common housing.

Figure 2:
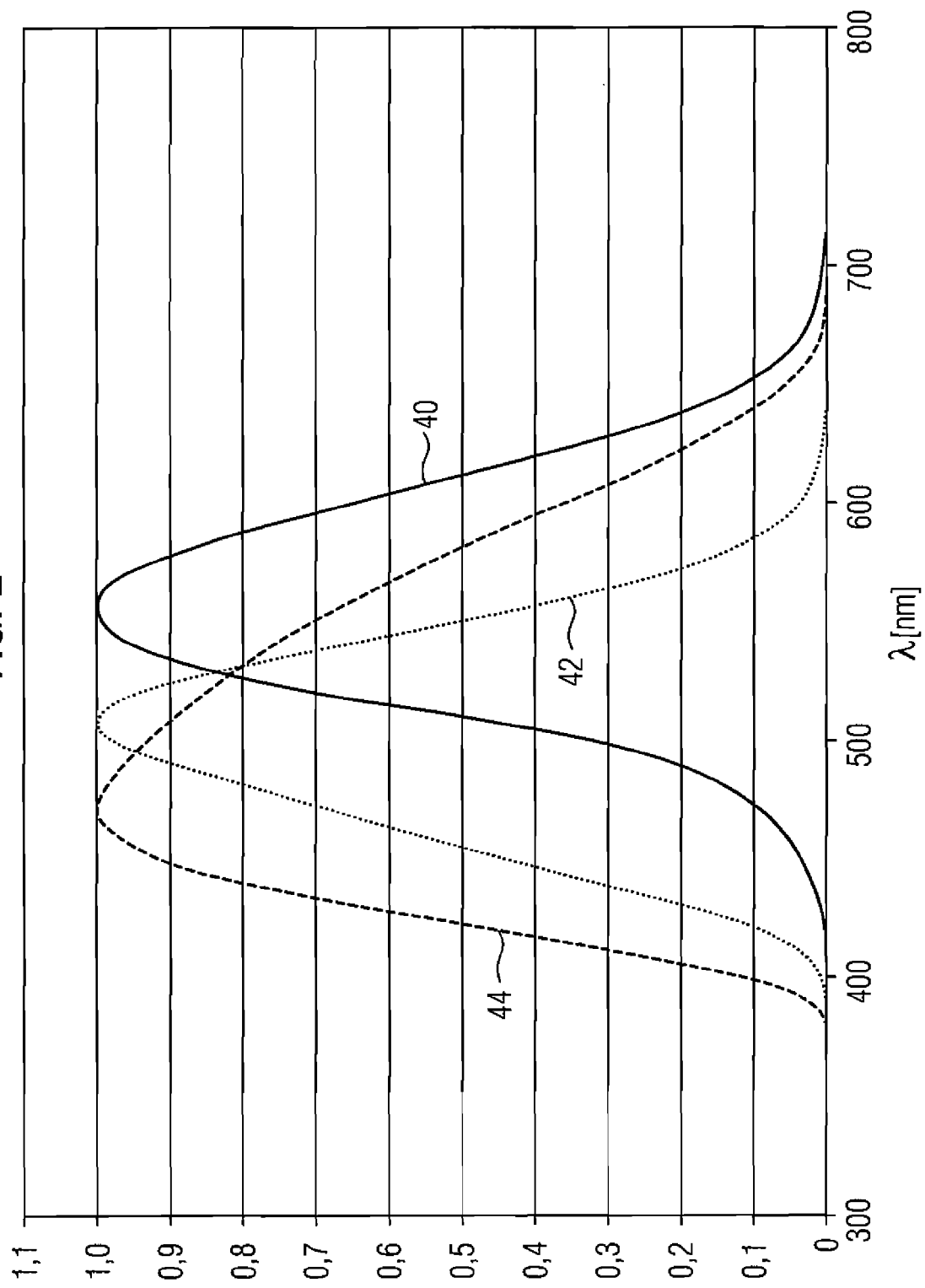
FIGS. 2 to 4 each show a diagram with a number of spectral response characteristics.
Figure 3:
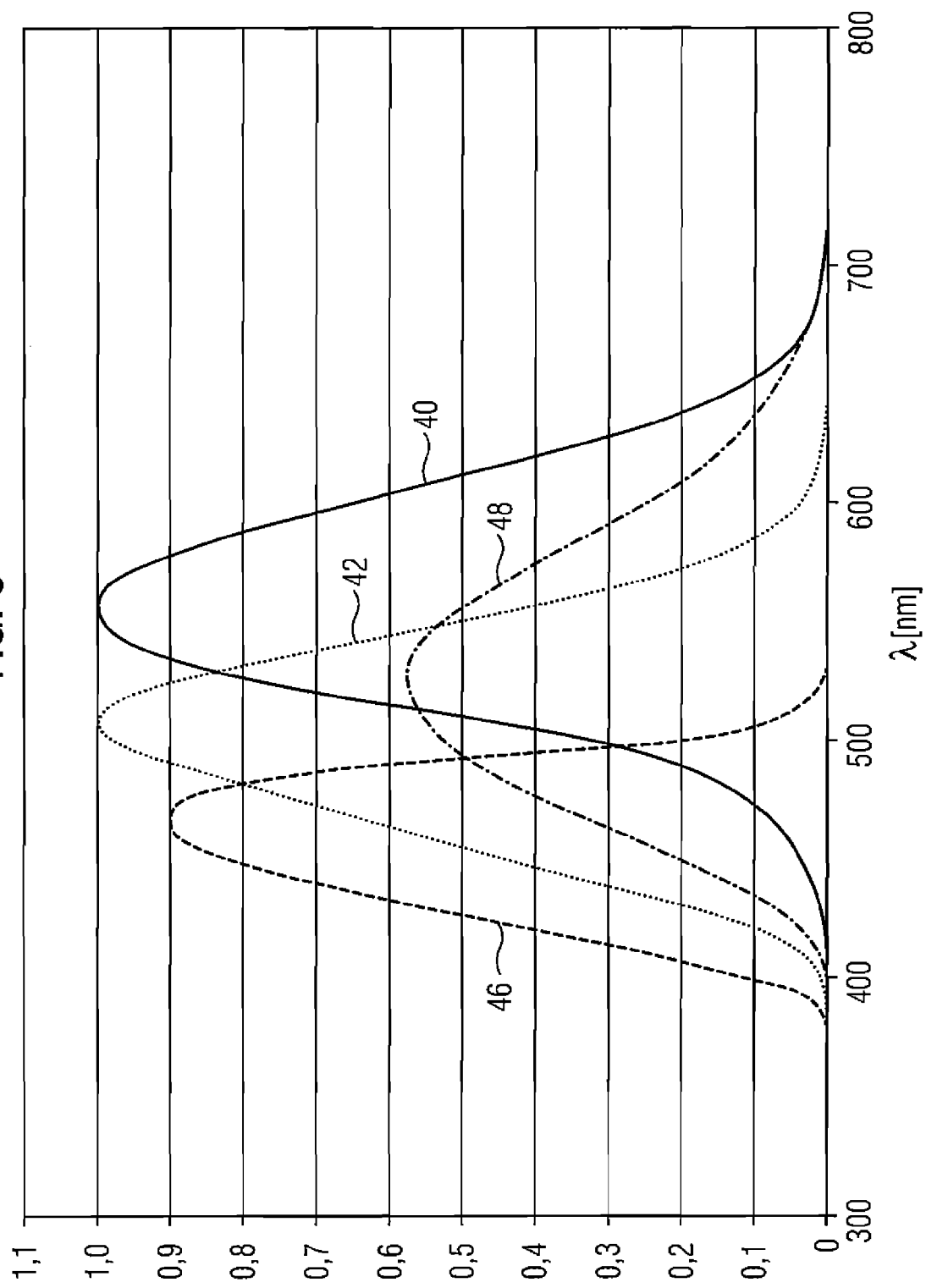

The fundamental principles for the design conception of the illuminance sensors can be explained in more detail by means of the spectral representations in FIGS. 2, 3 and the following table:

TABLE 1

| Light source | Photopic | Scotopic | "Blue" |
| --- | --- | --- | --- |
| Halogen | 1 | 1 | 1 |
| HID | 1 | 1.24 | 1.90 |
| LED | 1 | 1.20 | 2.09 |

The table gives relative brightnesses for some examples of different light sources for different perception states of the eye. The standardization was effected, on the one hand, in such a way that, with photopic response of the eye, all light sources shall have the same brightness. For the comparison of the light sources HID and LED with halogen, on the other hand, the brightness for halogen was again standardized to 1 for the responses "scotopic" and "blue" (which corresponds to the perception with the response characteristic of the blue retinal cones), irrespective of the fact that the brightnesses differ from the brightness with photopic vision. In this way, a qualitative comparison of HID and LED with halogen is possible in a particularly simple way. It is clear from this table that a "scotopic" glaring-light sensor, i.e. a glaring-light sensor adapted to the scotopic eye response characteristic, would take into account a somewhat greater glare in the case of HID light or LED light, as compared with a "photopic" glaring-light sensor, but subjectively, the glare caused by these light sources is increased more strongly than only by the determined 24% or 20%, respectively. With a sensor corresponding to the "blue" response characteristic, this increased glared was, therefore, taken into account in a more suitable way. The design criterion that blue contributions should be taken into account to a particularly high degree when acquiring the glaring light, is additionally shown more clearly in the diagrams of FIGS. 2 and 3. The latter show, qualitatively and in the manner of a standardized representation, in each case as a function of the wavelength ÿ, a characteristic 40, illustrating the spectral response of the eye in photopic vision, and a characteristic 42, illustrating the spectral response of the eye in scotopic vision. The increased consideration of blue contributions when acquiring the glaring light, according to the design, can be achieved, as shown in FIG. 2, by an acquisition through only one glaring-light sensor, by shifting the latter's spectral response characteristic towards shorter wavelengths, in comparison with the scotopic eye response characteristic 42. This is illustrated in an exemplary way by a response characteristic 44 which is characteristic for the sensor. As can be taken from the response characteristic 44, contributions of a longer wavelength can also be taken into account, although to a reduced extent.

Alternatively, the above-mentioned design criterion can also be achieved by using two (or more) sensors, as shown in the diagram according to FIG. 3. A first sensor, designed as a "blue sensor" with a spectral response according to the response characteristic 46 can be provided, which is completed by another sensor with a spectral response according to the response characteristic 48, covering the range of medium to long waves. Of course, many other mixed variants are imaginable, for example a combination of two sensors whose response characteristics are shifted to different extents towards shorter wavelengths in comparison with the scotopic eye response characteristic according to the characteristic 42.

Figure 4:
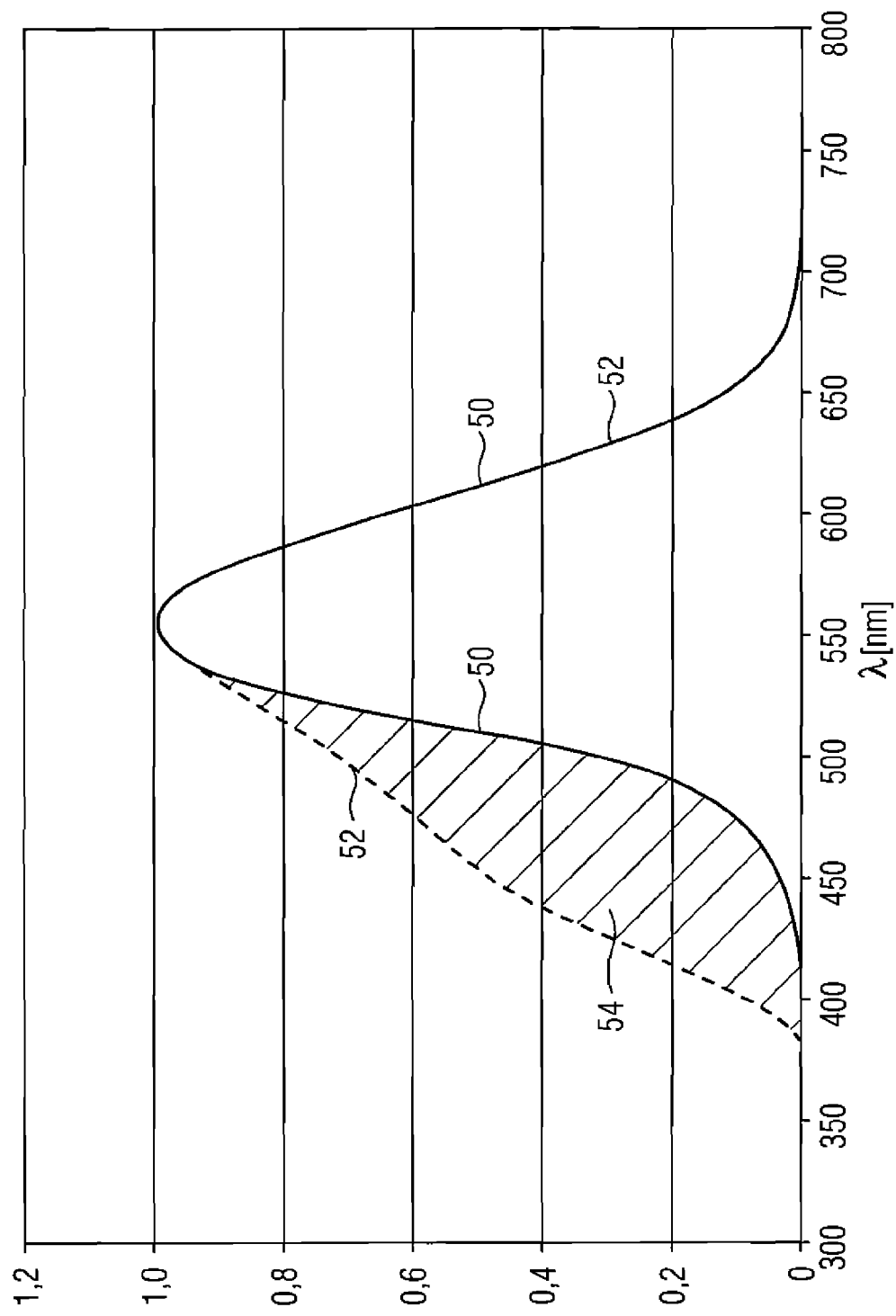

The diagram of FIG. 4, on the other hand, shows an example in which the "blue-emphasized" sensor is formed by a system of several sensor elements with different spectral response characteristics 50, 52. The spectral response characteristics 50, 52 of the example shown are congruent in the long wave range, but differ in the short wave range. This is highlighted in the diagram by the hatched surface 54.

Although each of these sensor elements has its individual response characteristic 50 or 52, respectively, each with the emphasis on the red range and with a maximum at the "photopic" point, it is possible to generate an "effective" or resulting response characteristic with the desired spectral properties shifted into the blue wavelength range, through a suitable functional linking of the response characteristics 50, 52 with each other, in the exemplary embodiment through difference forming. This resulting response characteristic corresponds in each case to the extension of the surface 54 in y-direction and, therefore, shows a maximum response characteristic at a wavelength of approx. 450 nm. In particular with a sensor with linear transmission behavior, in which the response is proportional to an output signal, for example an output voltage, a sensor system having the desired spectral properties can be produced in this way in a particularly simple manner.

What is claimed is:

1. A rearview mirror system, comprising:
   a rearview mirror including a reflection part having a variable reflectance;
   a control system associated with the reflection part; and
   a glaring-illuminance sensor configured to provide a spectral response having a response characteristic shifted towards shorter wavelengths as compared to a scotopic eye response characteristic.

2. The rearview mirror system as recited in claim 1, further comprising a further glaring-illuminance sensor.

3. The rearview mirror system as recited in claim 2, wherein the further glaring-illuminance sensor is configured to provide a further spectral response having a further response characteristic shifted towards longer wavelengths as compared to the scotopic eye response characteristic.

4. The rearview mirror system as recited in claim 2, wherein the further response characteristic approximately corresponds to the scotopic eye response characteristic.

5. The rearview mirror system as recited in claim 2, wherein the further response characteristic is shifted towards shorter wavelengths as compared to the scotopic eye response characteristic.

6. The rearview mirror system as recited in claim 2, further comprising a check unit connected to and receiving sensor signals from the glaring-illuminance sensors, wherein the check unit determines a nominal value for the reflectance of the reflection part using the sensor signals.

7. The rearview mirror system as recited in claim 6, further comprising an illuminance sensor connected to the check unit, wherein the sensor signals also include sensor signals from the illuminance sensor.

8. The rearview mirror system as recited in claim 6, wherein the check unit takes into account the sensor signals of the glaring-illuminance sensors in relation to each other, as a function of at least one of a glaring illuminance and a luminous intensity of the environment, in a weighted manner.

9. The rearview mirror system as recited in claim 6, wherein the check unit takes into account the sensor signals of the glaring-illuminance sensors in relation to each other in a relationship that is at least one of: a) predetermined, b) stored in a characteristic diagram and c) specified by a user.

10. The rearview mirror system as recited in claim 1, wherein the rearview mirror is a motor vehicle rearview mirror.

* * * * *